United States Patent [19]
Kriesgman et al.

[11] Patent Number: 5,523,951
[45] Date of Patent: Jun. 4, 1996

[54] SYSTEM AND METHOD FOR AUTOMATIC SHIP STEERING

[75] Inventors: Jules Kriesgman, Philadelphia; Martin E. Leblang, Warrington, both of Pa.

[73] Assignee: The United States of America as represented by the Secretary of the Navy, Washington, D.C.

[21] Appl. No.: 278,675

[22] Filed: Jul. 18, 1994

Related U.S. Application Data

[63] Continuation-in-part of Ser. No. 758,976, Sep. 6, 1991.

[51] Int. Cl.$^6$ .............................. G01S 3/14; G05B 11/36; B63H 25/06

[52] U.S. Cl. .................. 364/444; 364/457; 364/447; 364/449; 342/357; 342/451; 318/588

[58] Field of Search .................................. 364/444, 445, 364/447, 449, 452, 456, 457, 436, 148, 153, 732, 735; 342/352, 357, 450, 451; 318/588; 440/1, 2

[56] References Cited

U.S. PATENT DOCUMENTS

| | | | |
|---|---|---|---|
| 3,630,079 | 12/1971 | Hughes et al. | 73/178 R |
| 3,646,454 | 2/1972 | Southern | 364/161 |
| 3,727,036 | 4/1973 | O'Connor et al. | 364/161 |
| 4,383,259 | 5/1983 | Rader | 343/103 |
| 4,428,052 | 1/1984 | Robinson et al. | 364/457 |
| 4,513,378 | 4/1985 | Antkowiak | 364/450 |
| 4,533,918 | 8/1985 | Virnot | 364/456 |
| 4,590,569 | 5/1986 | Rogoff et al. | 364/452 |
| 4,590,570 | 5/1986 | Raden | 364/452 |
| 4,817,027 | 3/1989 | Plum et al. | 364/732 |
| 4,894,662 | 1/1990 | Counselman | 342/357 |
| 5,107,424 | 4/1992 | Bird et al. | 364/424.01 |
| 5,152,239 | 10/1992 | Hossfield et al. | 318/588 |
| 5,161,099 | 11/1992 | Yamaguchi | 364/153 |
| 5,179,905 | 1/1993 | Hossfield et al. | 318/588 |
| 5,313,397 | 5/1994 | Singh et al. | 364/457 |

OTHER PUBLICATIONS

Grossman, Stanley I., "*Calculus*", 3rd Ed., 1984.

*Primary Examiner*—Kevin J. Teska
*Assistant Examiner*—Tyrone V. Walker
*Attorney, Agent, or Firm*—Susan E. Verona

[57] ABSTRACT

A real-time ship steering system provides steering of a survey ship along a prescribed thumb line track in accordance with a received point location on the thumb line and a received heading of the rhumb line. The system of the present invention requires an integrated navigation system, a track-keeping interface, and a ship autopilot to steer a ship. The computer of the navigation system integrates position data from continuous fixed radio and satellite positioning systems, inertial navigation systems, and dead reckon aids to develop the best present position. At prescribed equally spaced times, the best present position is used to compute the off-track distance of the ship. The off-track distance is used to develop proportional and integral heading corrections, which are applied to the autopilot by way of the track-keeping interface. The autopilot accepts the correction signal as a bias to the desired ground track heading, causing the ship to be steered toward the desired track. Heading corrections are apportioned over a number of increments between computations in order to gradually lock the ship onto the track.

3 Claims, 9 Drawing Sheets

1

SYSTEM AND METHOD FOR AUTOMATIC SHIP STEERING

The invention described herein may be manufactured and used by or for the government of the United States of America for governmental purposes without the payment of any royalties thereon or therefor.

RELATED U.S. APPLICATIONS

This application is a continuation in part of copending application Ser. No. 07/758,976 filed Sep. 6, 1991.

BACKGROUND THE INVENTION

This invention relates to the field of navigation and is particularly suited for automatic ship steering.

In navigating a ship on the high seas it is desirable for reasons of speed, accuracy, efficiency and cost to hold the ship closely to a predetermined course or track. Because of the many dynamic disturbances a ship encounters at sea, such as currents, tides, winds and waves, as well as the absence of any recognizable visual cues, manual course corrections in the past were done only intermittently, allowing errors to build up. These course corrections primarily involved changes in heading from the present location toward the chosen destination and were based on compass indications and visual astronomical position fixes.

With the advent of mechanical motion measuring instruments and computers, automatic pilot systems were introduced to steer ships along a preset course. These systems were usually designed to hold a ship to a constant heading based on compass data inputs and required periodic manual corrections to compensate for accumulated track errors arising from environmental and systematic disturbances.

Precision course tracking is particularly important for survey ships that collect and map bathymetric, i.e. depth, gravimetric and geomagnetic data. These ships are required to collect and plot their data along prescribed courses, usually rhumb line tracks that run for long distances. A rhumb line track is a track which intersects all meridians at a constant angle. These surveys are usually carried out by traversing a region repeatedly along several closely spaced parallel rhumb lines and therefore require not only precise heading control but also precise positioning control. If the spacing between surveyed rhumb line tracks becomes too great due to the ship straying from the desired track, intermediate data may have to be collected to fill in gaps. If the tracks become too close or overlap, unnecessary redundancies may result. Because of the high cost of these surveys, it is essential that they be carried out accurately and efficiently. Thus there is a requirement for an autopilot steering system which will provide virtually instantaneous course corrections and continuous track control.

SUMMARY OF THE INVENTION

This invention discloses a real-time ship steering system that holds a ship to a prescribed track by making instantaneous heading corrections based on continuously received position data. The system of the present invention requires an integrated navigation positioning system, a track-keeping interface, and a ship autopilot to steer a ship. The computer of the navigation positioning system integrates position data from continuous fixed radio and satellite positioning systems, inertial navigation systems, and dead reckoning aids to develop the best present position. Prior to beginning a track line for which automatic control is desired, the track line specification is input to the navigation computer. This track line specification allows the navigation computer to determine the heading correction required to maintain the ship on the desired ground track. At prescribed intervals, the best present position is used to compute the off-track distance of the ship from the specified track using an iterative parabolic minimization algorithm. The off-track distance is used to develop proportional and integral heading corrections, which are applied to the autopilot by way of the track-keeping interface. The autopilot accepts the correction signal as a bias to the desired ground track heading, causing the ship to be steered toward the desired track. Heading corrections are apportioned over a number of increments in order to gradually lock the ship onto the track. The track-keeping algorithm requires high-quality best present position data. This data may be provided by continuous satellite, such as navstar global positioning system (GPS) or by Loran or other suitable navigation aids. The computer in response to control law algorithms being run therein develops the proportional and integral components of heading correction by utilizing the off-track distance. The computer of the integrated navigation positioning system determines the required off-track distance. The computer of the integrated navigation positioning system determines the required off-track distance by using the best available position data and applying an iterative parabolic minimization algorithm to the data in conjunction with the track line specification to quickly converge to the minimum distance between the ship and the track line. Generally, the proportional component compensates for short-duration disturbances such as wind gusts and the integral component compensates for persistent disturbances such as ocean currents. Closing velocity limitations are imposed to provide an alternative approach to conventional differential control. In the case of oceanographic survey ships, the specified track will usually be a rhumb line track.

Therefore, it is a principal object of the invention to provide a means to accurately steer a ship along a prescribed course, such as a rhumb line, for indefinite distances.

It is a further object of the invention to enhance the accuracy and efficiency of existing autopilot steering control systems.

It is a further object of the invention to provide an automatic steering control system to hold an oceanographic survey ship to a prescribed track.

It is a further object of the invention to provide an automatic ship steering control system which will reduce the cost of operating a ship.

Other objects, advantages and novel features of the invention will become apparent from the following description of the invention when considered in conjunction with the accompanying drawings.

BRIEF DESCRIPTION OF THE DRAWINGS

An embodiment of the invention is described by way of example with reference to the accompanying drawings in which.

DETAILED DESCRIPTION OF THE INVENTION

Figure 1:
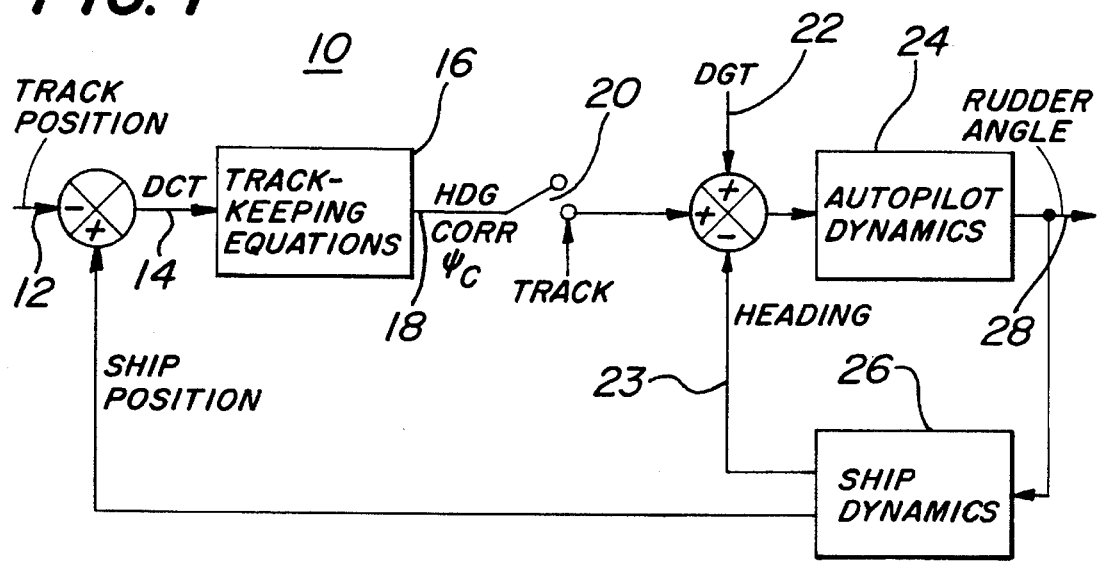
FIG. 1 shows a functional block diagram representation of the automatic ship steering system of the present invention.
Figure 2:
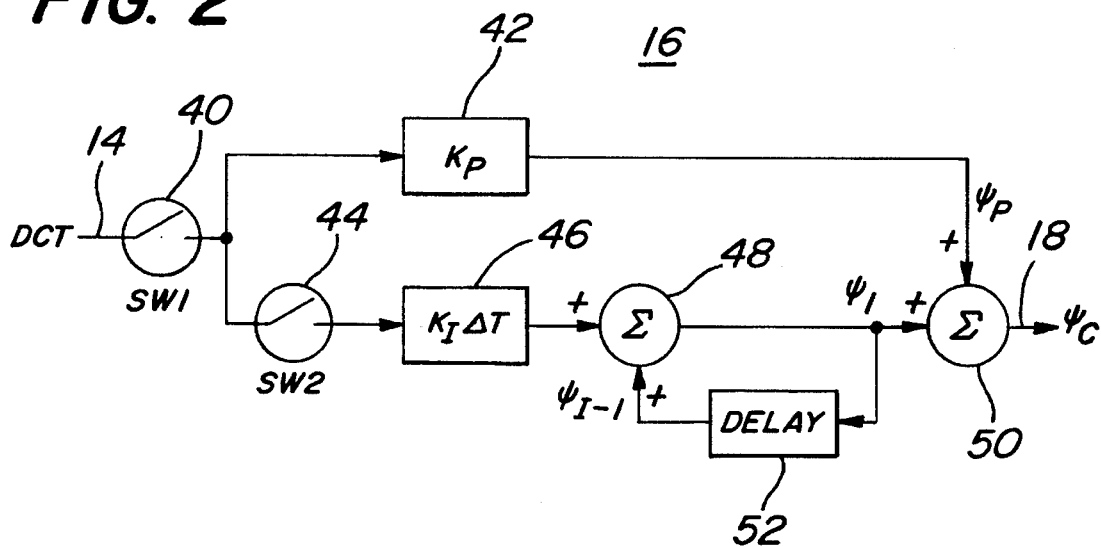
FIG. 2 shows a more detailed flow diagram of the ship steering control law equations of the automatic ship steering system of FIG. 1.
Figure 3:
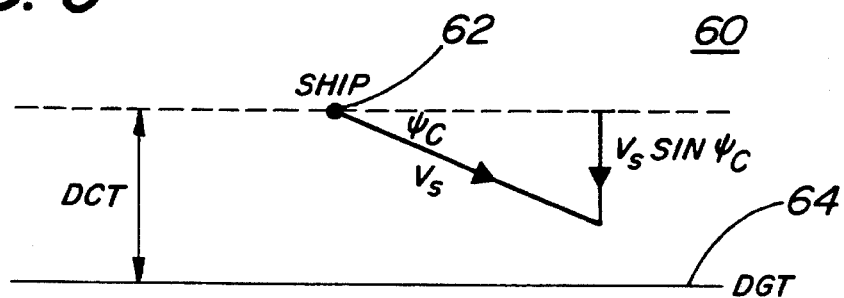
FIG. 3 shows the proportional and integral gain selection development chart of the ship-steering control law equations of FIG. 2.
Figure 9:
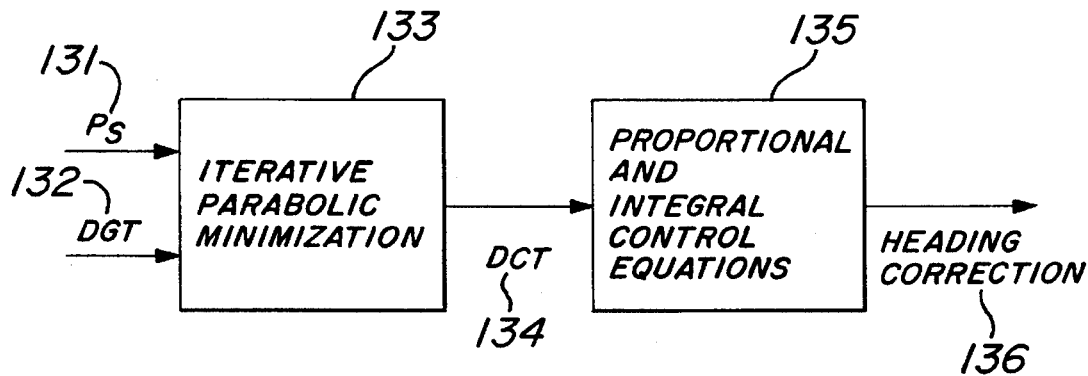
FIG. 9 shows the track keeping equations of FIG. 1.

Referring now to FIGS. 1, 2, 3, there are shown, respectively, a functional block diagram of automatic track keeping system 10 of the present invention, a more detailed flow diagram representation of ship steering control law equations block 16 or track-keeping equations block 16, as well as proportional and integral gain selection development chart 60. The two components of the control law equations 16 are shown in FIG. 9. The two components are: the iterative parabolic minimization 133 and the proportional and integral control equations 135. As seen in FIG. 1, the automatic ship steering system 10 of the present invention receives as its input a point on a rhumb line and a heading. System 10 then holds a course for an indefinite distance along the rhumb line defined thereby. The relationships expressed within automatic ship steering equations block 16 provide proportional and integral control within ship steering system 10 to permit ship steering system 10 to hold this course. Gain selection development chart 60 sets forth the geometric relationship required to compute the gain constants of block 16 position distance across track, DCT, of ship 62.

In automatic ship steering system 10, the heading of desired ground track (DGT) 64 is provided to autopilot dynamics 24 by way of input line 22. It will be understood that autopilot dynamics block 24 of system 10 represents a mathematical model of an actual autopilot. After the heading of desired ground track heading 64 is provided, the helmsman of ship 62 steers ship 62 toward desired ground track 64 in order to initiate the automatic ship steering operation of ship 62. This positioning of ship 62 must be to within conventional start-up tolerances as understood by those skilled in the art.

Once ship 62 is within start-up tolerances, automatic ship steering system 10 provides the necessary corrections to steer ship 62 onto desired ground track 64 and maintain ship 62 along desired ground track 64 for an indefinite number of nautical miles. Thus it will be understood that when ship 62 is steered onto desired ground track 64 and the heading corrections applied to automatic ship steering system 10, system 10 is adapted to hold ship 62 onto a desired ground track defined thereby indefinitely. The desired ground track may be, for example, a rhumb line.

Environmental disturbances such as wind, waves, and ocean currents tend to drive ship 62 off desired ground track 64 during normal travel of ship 62. However, it is the function of automatic ship steering system 10 of the present invention to restore ship 62 to desired ground track 64 under these conditions. Main control loop switch 20 of ship steering system 10 is disposed in the open position to provide the correct ship steering control prior to the start of a run along a thumb line. This type of operation of ship steering system 10 is open-loop operation. During this open-loop operation autopilot dynamics 24 and ship dynamics 26 operate in a conventional manner to control the rudder (not shown) by way of line 28 and no proportional or integral control are provided within track keeping equations 10. It will be understood that ship dynamics block 26 within system 10 is a mathematical model of ship 62.

The automatic track control operation of automatic ship steering system 10 of the present invention is activated by closing main loop control switch 20 to provide closed loop operation. This closed-loop operation of ship steering system 10 or track-keeping system 10 adds the ship steering control law to the steering control mechanization as shown in track-keeping equations block 16. The operations performed within track-keeping block 16 or ship-steering block 16 add proportional and integral heading compensation to autopilot dynamics 24, as required, to maintain ship 62 along desired ground track 64.

Thus it will be understood that in automatic ship steering system 10 of the present invention, autopilot dynamics 24 receives heading correction information from block 16 as well as desired ground track heading information 22. The heading correction information thus serves as a bias toward DGT heading 22. Distance input switch 40 and integral gain switch 44 of equation block 16 permit control of the compensation provided to ship 62 by automatic ship steering system 10.

Figure 10:
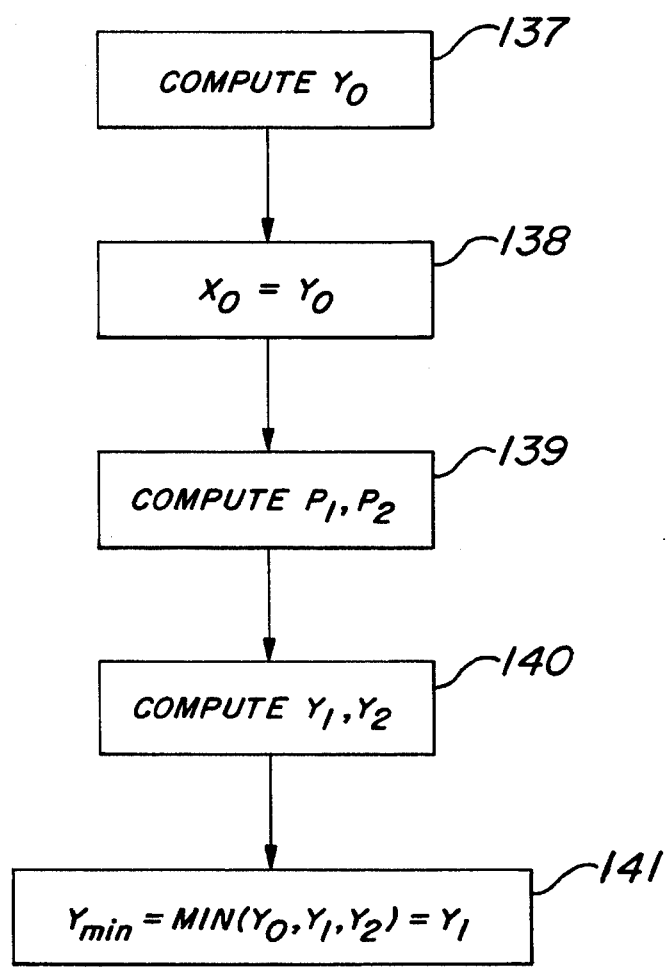
FIG. 10 shows the flow chart for iterative parabolic minimization initialization.
Figure 11:
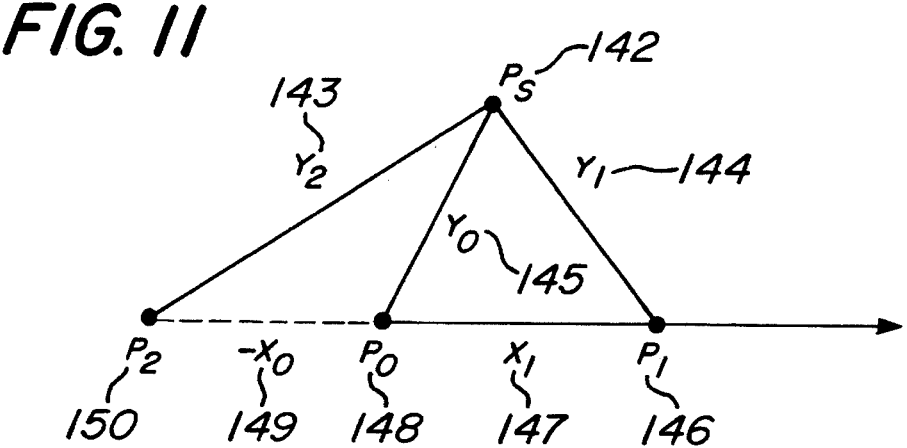
FIG. 11 shows a graphical representation of the initialization of iterative parabolic minimization.
Figure 13:
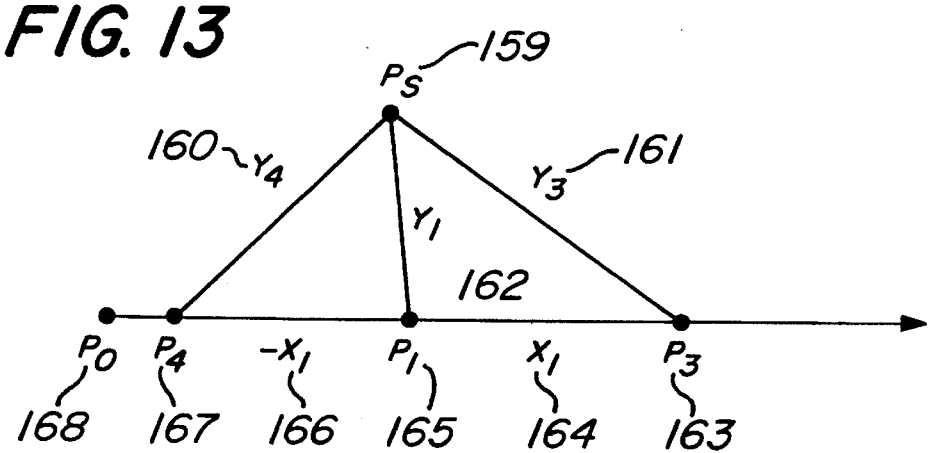
FIG. 13 shows a graphical representation of the first phase of the iterative parabolic minimization algorithm.
Figure 14:
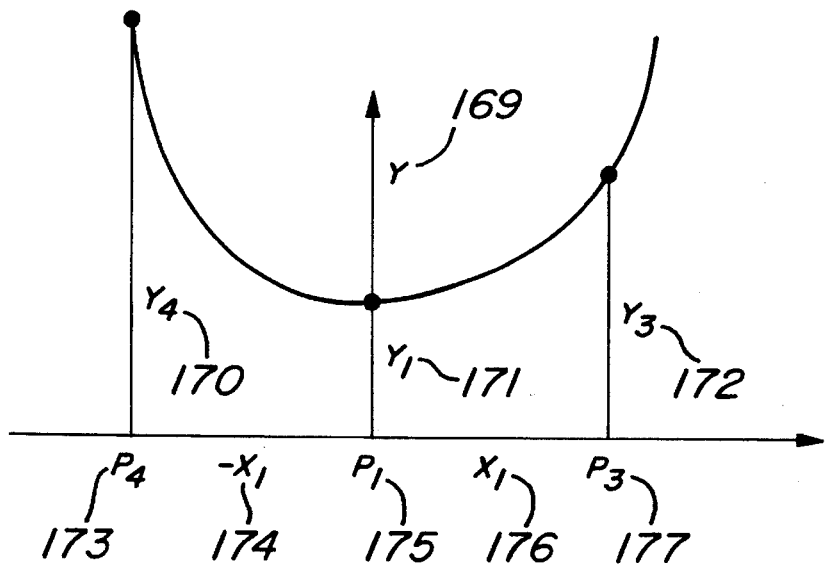
FIG. 14 shows a graphical representation of the final stage of the iterative parabolic minimization algorithm.
Figure 12:
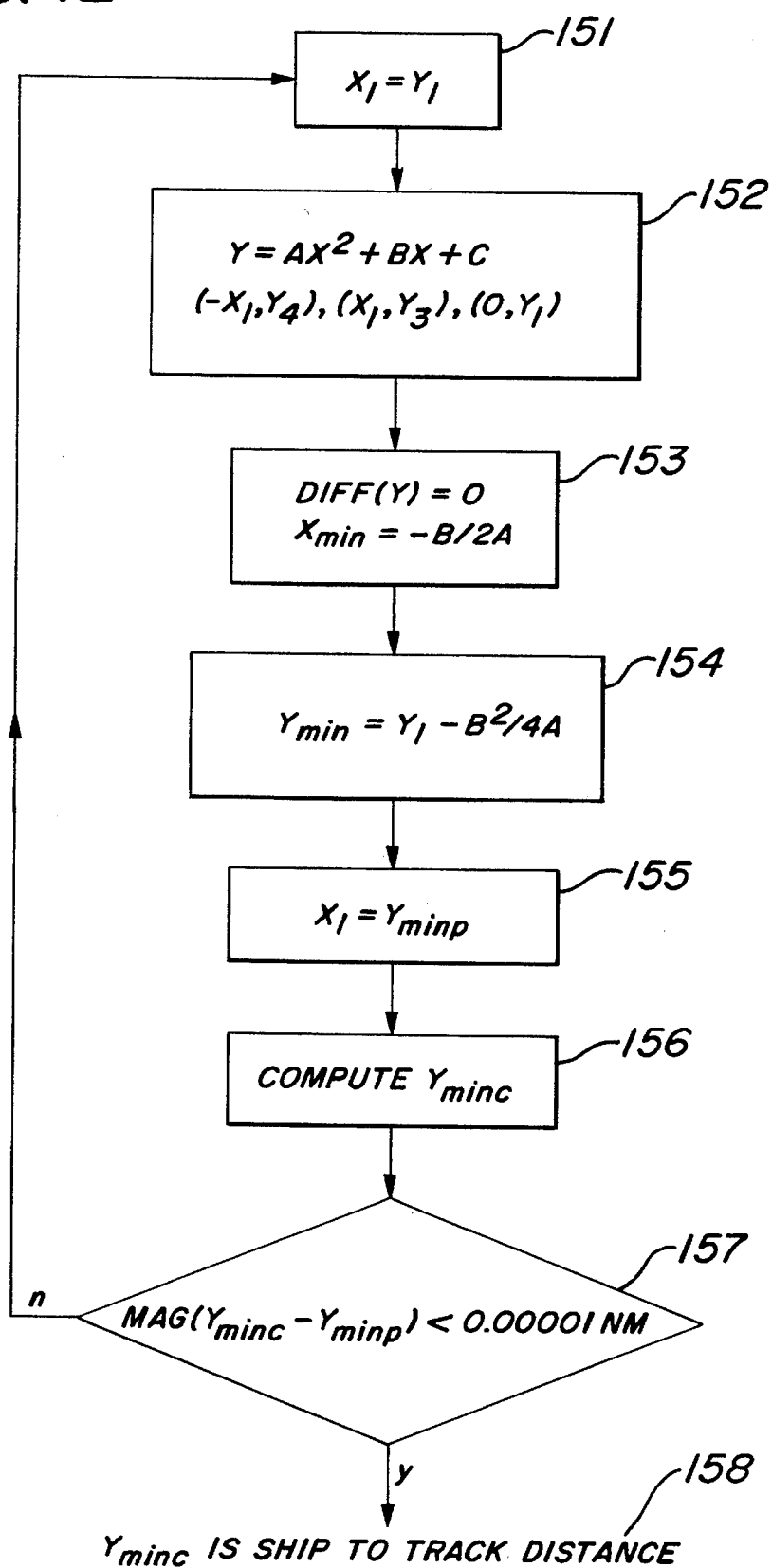
FIG. 12 shows the flow chart for the iterative parabolic minimization algorithm.

As generally illustrated in FIG. 9, the first component of the track keeping equations 16 is the iterative parabolic minimization 133. The iterative parabolic minimization 133 control equations determine the shortest distance from the current ship position 142 [generally indicated in FIG. 11 as $P_s$] to the closest point on the desired ground track. Referring to FIGS. 10, and 11 iterative parabolic minimization initializes by computing an arbitrary distance from the current position 141 to a point on the desired ground track 148. Then two other points on the desired ground track arbitrarily chosen by making $x_0$ 149 and $x_1$ 147 equal to $Y_0$ 144, the arbitrary distance from the current ship position 145 to the desired ground track. This simple equation then gives points $p_1$ 146 and $P_2$ 150 on the desired ground track and from $p_1$ 146 and $P_2$ 150 distances $y_1$ 144 and $y_2$ 143 are computed. The minimum of these distance is then chosen as the initial y for the final phase of the iterative parabolic minimization equation. Referring now to FIGS. 12, 13, and 14 the iterative parabolic minimization control equation first sets $y_1$ equal to $x_1$ 151, as is graphically shown in FIG. 13. From these two $x_1$ distances two points on the desired ground track are computed $p_3$ 163 and $P_4$ 167. From these coordinates, $(-x_1,y_4),(x_1,y_3),(0,y_1)$, the coefficients of the parabolic iterization equation A, B, C are computed in segment 152 as shown in FIG. 12.

The goal of the parabolic minimization equation is to find the shortest distance between the current ship position and the desired ground track. This is done by differentiating the parabolic equation 153

$$\left( \frac{dy}{dx} = 2Ax + B \right)$$

and setting the differentiation to 0. Solving this differentiation for the minimum x distance gives $$x_{min} = \frac{-b}{2a}$$

plugging this $X_{min}$ into the original parabolic equation gives a minimum y as $$y_{min} = \frac{-b^2}{4a} + c.$$

If the coordinate system is chosen such that $x_1=0$ then the minimum y distance becomes c therefore the next step of the parabolic minimization 153 uses the equation $y_{min}=y_1-b^2/4a$.

The previous computed minimum distance $y_{minp}$ is then subtracted from the current minimum distance $Y_{minc}$ and the result is compared with a threshold indicated in segment 157. Once the current and previous minimum distance are less than the threshold that distance is considered the minimum distance to the desired ground track and it is fed into the next stage of the control equations 135 (FIG. 9). As long as the results of the past and current minimum distances are greater than the threshold the parabolic minimization calculation iterates to segment 151 illustrated in FIG. 12. When the results of the past and current minimum distances are less than the threshold the shortest distance between the current ship position and the desired ground track 134 (as seen in FIG. 9) is passed to the integral and proportional control equations 135. A flow diagram of the integral and proportional control equations is shown in FIG. 2.

In the preferred embodiment of ship steering system 10 a run along a rhumb line is started when ship 62 (seen in FIG. 3) is approximately one-tenth of a nautical mile from desired ground track 64. To prevent excessive integral compensation accumulation during operation of ship steering system 10, resulting in undesirable overshoot of desired ground track 64, only proportional compensation is applied. Therefore, distance input switch 40 (see FIG. 2) is closed and integral gain switch 44 is open during the preliminary approach to desired ground track 64. When distance input switch 40 is closed, tracking system distance across track 14 is applied to proportional gain block 42 of ship steering equations block 16. The output of proportional gain block 42 may be expressed as:

$$\psi_p = K_p \cdot DCT$$

where $\psi_p$ is the proportional heading correction, $K_p$ is the proportional gain, and DCT represents the distance across track of ship 62.

When ship 62 is approximately one-tenth of a nautical mile from desired ground track 64, time integral compensation is added within automatic ship steering system 10 by closing integral gain switch 44. When integral gain switch 44 is closed, tracking system distance across track 14 is applied to integral gain block 46 of ship steering equations block 16. In integral gain block 46, the distance across track of ship 62 is multiplied by the integral gain, $K_I$ and the compensation application time interval, $\Delta T$.

The signal at the output of integral gain block 46 is applied to summation node 48. Additionally, the integral heading compensation of summation node 48, $\psi_I$ is applied to delay block 52 to produce a delayed value which is fed back to summation node 48. The previous-integral heading compensation signal, applied to summation node 48 by way of delay block 52, may be expressed as $\psi_{I-1}$. Thus the output of summation node 48 may be expressed as:

$$\psi_I = \psi_{I-1} + K_I \Delta T \cdot DCT$$

The proportional heading compensation from proportional gain block 42, $\psi_P$, and the integral heading compensation from summation node 48, $\psi_I$ are both applied to summation node 50. The resulting output of block 16, appearing on output line 18 of summation node 50, represents the desired ground track heading compensation, $\psi_C$. This heading compensation information appearing on line 18 (see FIG. 1) is applied to autopilot dynamics 24 along with the desired ground track heading 22 in system 10. This relationship may be expressed as:

$$\psi_C = \psi_P + \psi_I$$

In order to further minimize overshoot and to provide a smooth lock onto ground track heading 64, no proportional compensation and no additional integral compensation are added to autopilot dynamics 24 when the closing velocity of ship 62 exceeds one-half knot. Thus, tracking system input switch 40 or distance input switch 40 is opened when the component of the velocity of ship 62 perpendicular to track 64 and moving toward track 64 at a speed which exceeds one-half knot.

The proportional and integral gain constants, $K_P$ see block 42 of FIG. 2) and $K_1$ (see block 46 of FIG. 2) respectively, are selected to yield a maximum permissible proportional heading correction of fifteen degrees for an off-track distance of one-tenth nautical mile from desired ground track 64 and an integral time or reset rate, $T_{rr}$. This corresponds to a nominal velocity of ship 62 of approximately fifteen knots. With these limits, using gain development chart the value of the proportional gain constant $K_P$ and the integral gain constant $K_I$ may be expressed as:

$$K_P = \frac{\Psi_{cmax}}{DCT_I} = \frac{15°}{0.1NM} = 150°/NM$$

$$T_{rr} = \frac{DCT_I}{V_s SIN\left(\frac{\Psi_{cmax}}{2}\right)} = \frac{0.1NM}{(15KTS)SIN\left(\frac{15°}{2}\right)} = 3MIN$$

$$K_I = \frac{K_P}{T_{rr}} = \frac{150°/NM}{3MIN} = \frac{3000°/NM}{HR} \quad K_I = \frac{K_P}{T_{rr}} =$$

$$\frac{150°/NM}{3MIN} = \frac{3000°/NM}{HR}$$

Under these conditions, design values of three minutes for $T_{rr}$ and gain values of one-hundred fifty degrees per nautical mile and three thousand degrees per nautical mile per hour for $K_P$ and $K_I$ respectively, are obtained. Using a reduced-order model ship dynamics consisting of yaw and sway, rudder dynamics, and autopilot controller dynamics, application of Liapunov stability analysis techniques verifies that the selected design constants yield stability within automatic ship steering system 10 of the present invention.

Thus it will be understood by those skilled in the art that when using automatic ship steering system 10 of the present invention, proportional and integral heading corrections derived from the distance off track of ship 62, may be applied to autopilot dynamics 24 of ship 62 to lock onto a prescribed thumb line track 64 and to steer ship 62 along track 64. This application of heading corrections 18 to autopilot dynamics 24 is in addition to desired ground track heading information 22 and compass heading 23. It will also be understood that accurate steering operation by automatic ship steering system 10 depends upon accurate continuous navigation data which may be obtained in a conventional manner.

A simulation of the motion of ship 62 during operation of automatic ship steering system 10 of the present invention was performed. This simulation included linear-state space models of the sway, yaw, and roll motions of ship 62; a non-linear surge equation to model rudder, sway, and coupled yaw/sway drag; and models of autopilot dynamics 24 and of steering hydraulics (not shown). The performance of automatic ship steering system 10 of the present invention was evaluated through simulations of the response of ship 62 to various external factors driving ship 62 away from desired ground track 64.

The simulation assumed a velocity of twenty knots for ship 62. The simulation also assumed a three knot ocean current crossing desired ground track 64 at forty-five degrees, and a one-half nautical mile initial offset of ship 62 from desired ground track 64. The maximum heading compensation $\psi_C$ permitted was twenty-five degrees for a distance of one-third nautical mile or more, from desired ground track 64. Otherwise, a maximum heading compensation of fifteen degrees was permitted. The maximum incremental heading correction permitted was two degrees. Integral compensation updates were introduced by automatic ship steering system 10 in this simulation only when the distance cross track of ship 62 from desired ground track 64 was one-tenth of a nautical mile or less.

Figure 4:
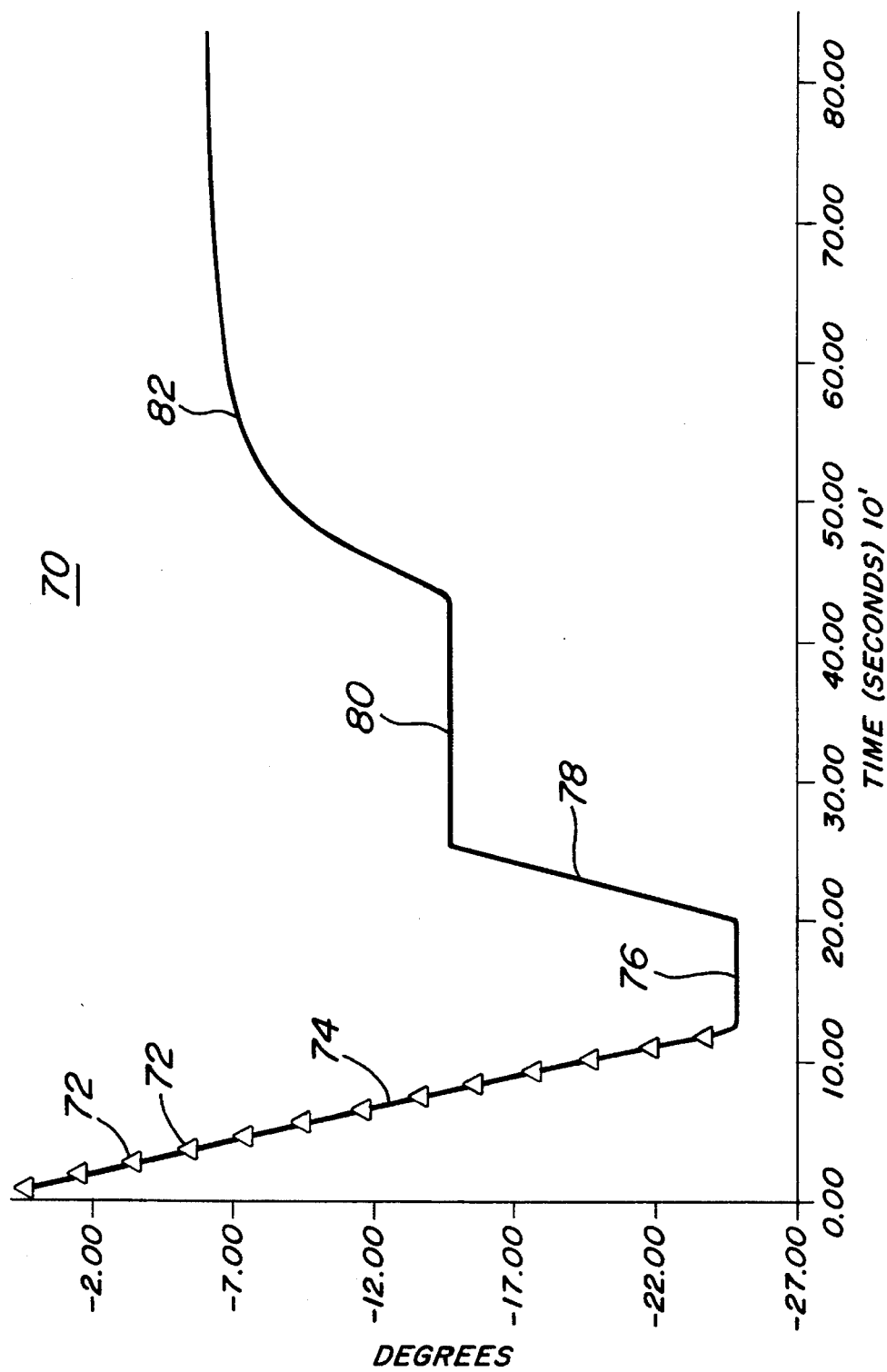
FIG. 4 shows a graphical representation of the heading correction commands of an automatically steered ship as a function of time during simulated operation of the automatic ship steering system of FIG. 1.

Referring now to FIG. 4, there is shown angle graphical representation 70. Angle graphical representation 70 sets forth the angle of correction as a function of time during simulation of the operation of automatic ship steering system 10 upon ship 62. Graphical representation 70 was generated by the simulation described herein above. Negative slope portion 74 of angle graphical representation 70, as well as positive slope portion 78 of graphical representation 70, represent time periods in which the theoretical proportional/integral control law correction of ship steering equations block 16 exceeded the maximum two degrees per increment correction limitation. The size of an increment is indicated by the vertical distance between successive plot symbols 72 of angle graphical representation 70.

Left flat portion 76 and right flat portion 80 of geographical representation 70, respectively, indicate a twenty-five degree maximum heading correction for the off-track distance of one-third nautical mile, or more, and a fifteen-degree maximum heading correction otherwise. Finally, curved portion 82 of geographical representation 70 represents operation of automatic ship steering system 10 whenever less than maximum allowable incremental heading corrections were required.

Figure 5:
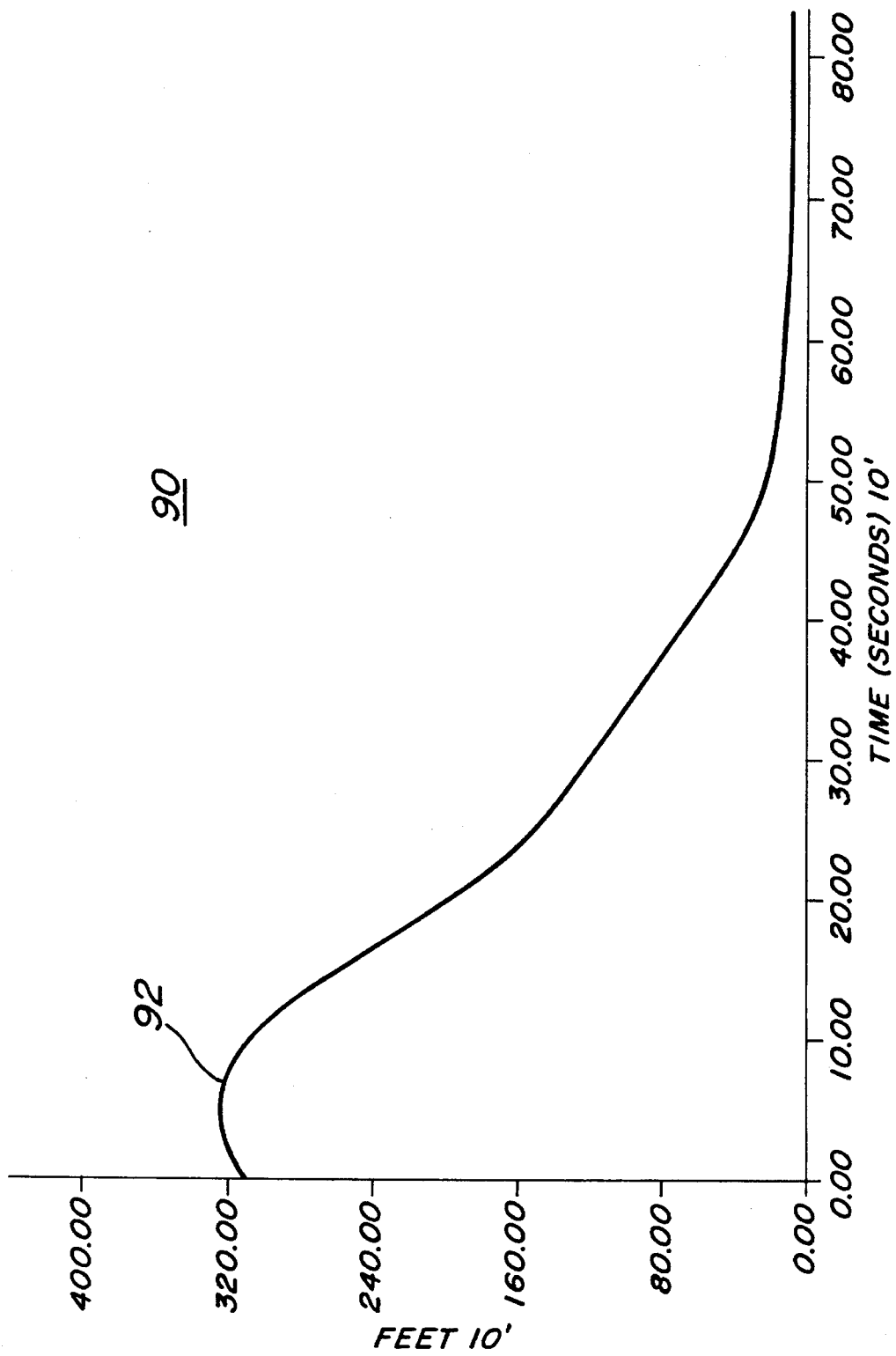
FIG. 5 shows a graphical representation of the off-track distance of an automatically steered ship as a function of time during simulated operation of the automatic ship steering system of FIG. 1.

Referring now to FIG. 5, there is shown distance graphical representation 90 of the off-track distance of ship 62. Graphical representation 90 was generated by the simulation of ship steering system 10 operating upon ship 62 described herein above. The off-track distance of distance representation 90 is expressed as a function of time in response to the combination of the proportional and integral heading corrections, $\psi_P$ and $\psi_I$, the ocean-current environment, the initial offset of ship 62 from desired ground track 64, and the velocity of ship 62.

Due to the two degree per increment heading correction application limitation, the effect of the ocean current causes ship 62 to initially move farther away from desired ground track 64 at the start of the simulated run. This movement is indicated in region 92 of distance graphical representation 90. As the heading correction application increases to the twenty-five degree limit permitted within system 10 for offsets of one-third nautical mile or more, the off-track distance decreases rapidly. When the off-track distance falls below one-third nautical mile, the maximum heading correction application $\psi_C$ is reduced to fifteen degrees, resulting in a corresponding decreased rate of movement toward desired ground track 64 by ship 62. Finally, as the off-track distance falls below one-tenth nautical mile the proportional heading correction $\psi_P$ gradually diminishes, while the integral compensation $\psi_I$ begins. Integral compensation builds up to the heading correction value required to compensate for the steady-state ocean current at the point of reaching zero off-track distance.

Figure 6:
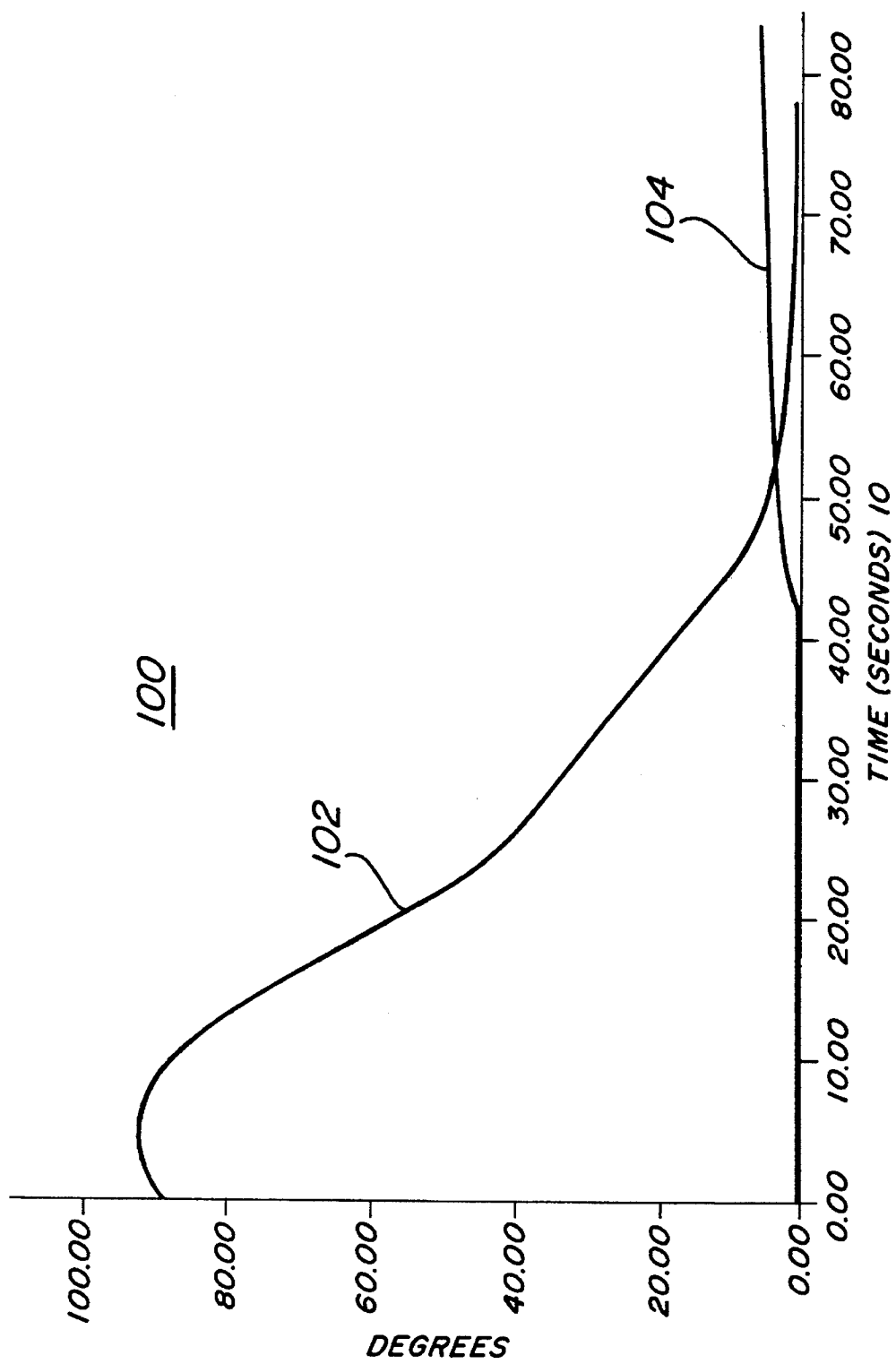
FIG. 6 shows a graphical representation of the proportional and integral components of the ship steering control law equations of FIG. 2 during simulated operation of the automatic ship steering system of FIG. 1.

Referring now to FIG. 6, there is shown graphical representation 100. Graphical representation 100 includes proportional correction curve 102, which represents the proportional compensation component, $\psi_P$, within ship steering system 10 and integral correction curve 104, which represents the integral compensation component, $\psi_I$. These compensation components are generated by the proportional/integral control law executed within ship steering equations block 16 of automatic ship steering system 10.

Proportional correction curve 102 represents the proportional compensation during the simulation of ship steering system 10 and integral correction curve 104 represents the integral compensation during the same simulation. Proportional correction curve 102 is similar in its general shape to off-track distance graphical representation 90. In accordance with the correction application of the simulation, integral corrections curve 104 indicates zero values for off-track distances in excess of one-tenth nautical mile, and gradual accumulation to the value required to compensate for the ocean current in the one-tenth nautical mile off-track distance range.

Figure 7:
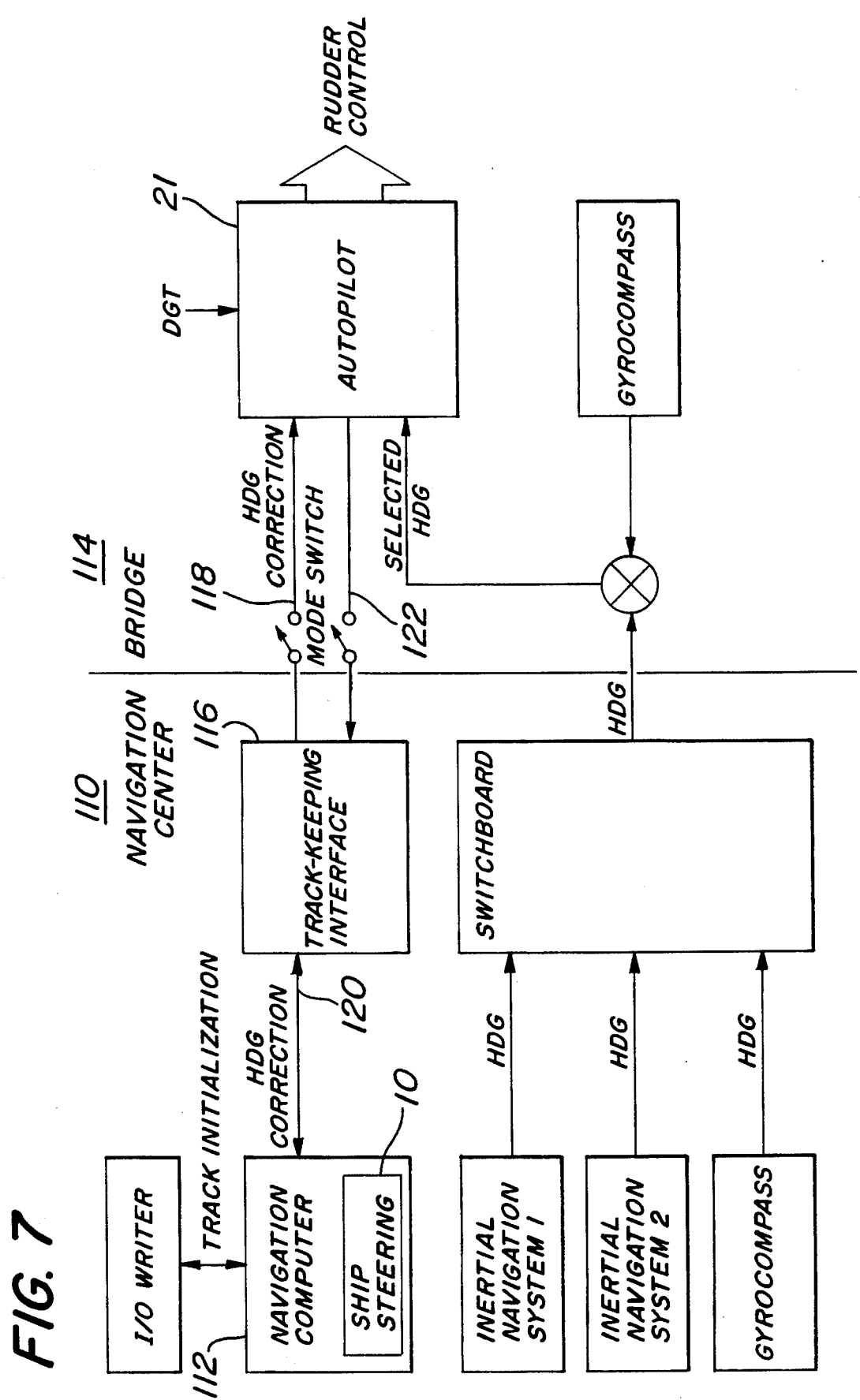
FIG. 7 shows a block diagram representation of the integration of the automatic ship steering system of FIG. 1 with other navigational equipment on board a ship.

Referring now to FIG. 7, there is shown a coupling of automatic ship steering system 10 (including autopilot dynamics 24 shown in FIG. 1) of the present invention with navigation center 110 of ship 62. The proportional/integral controller algorithm of ship steering equations block 16 of automatic ship steering system 10 is hosted in previously existing navigation computer 112. Track-keeping interface 116 of navigation center 110 provides data communications between navigation computer 112 of navigation center 110 and autopilot 21 of bridge 114 within ship 62 to permit system 10 to apply heading compensation $\psi_C$ by way of autopilot dynamics 24.

It will be understood by those skilled in the art that track-keeping interface 116 includes conventional digital-to-analog conversion functions required for communications between conventional host navigation computer 112 and autopilot dynamics 24. It will also be understood that autopilot dynamics 24, capable of receiving two inputs rather than one, may be formed by one skilled in the art from an autopilot (not shown) accepting only compass information. It will further be understood that automatic ship steering system 10 may be applied to a plurality of ship configurations differing from navigation system 110 and bridge 114 in a manner known to those skilled in the art.

Thus automatic steering system 10 receives position data, such as position data from a satellite global positioning system or other accurate positioning systems, computes the distance to desired track line 64, and steers ship 62 accordingly. A steering correction based on this distance is applied to autopilot dynamics 24 using digital-to-analog conversion within track keeping interface 116. Autopilot dynamics 24 steers ship 62 toward desired track line 64 by applying small controlled incremental course corrections in a manner adapted to prevent the disturbance of any gravimetric data gathering activity upon ship 62.

System 10 continues to provide course corrections in order to maintain ship 62 on predetermined ground track 64 once ground track 64 has been reached. Furthermore, automatic ship steering system 10 may be adapted to follow any predetermined track line equation, such as rhumb lines, great circles, and others if the corresponding equations are provided within ship steering equations block 16. Because automatic ship steering system 10 is adapted to maintain a predetermined heading over an indefinite distance, automatic ship steering system 10 is particularly useful for applications similar to those required by survey ships.

Figure 8:
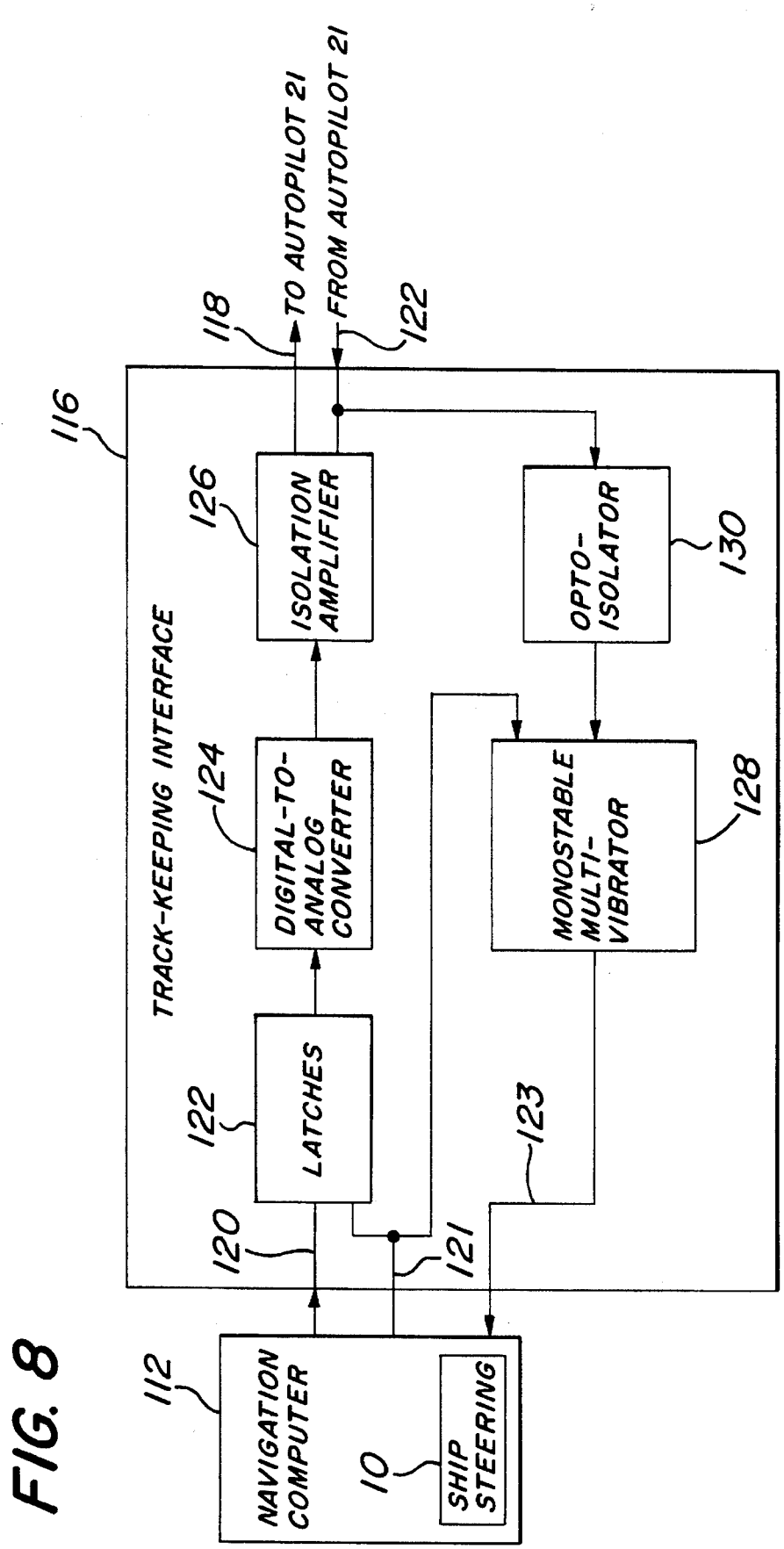
FIG. 8 shows a simplified block diagram representation of a track-keeping interface for the system of the present invention.

Referring now to FIG. 8, there is shown a more detailed block diagram representation of track-keeping interface 116. Track-keeping interface 116 couples navigation computer 112, which hosts automatic ship steering system 10, to autopilot 21. Navigation computer 112 operates at conventional TTL logic levels. It will be understood that alternate embodiments (not shown) of track-keeping interface 116 may be provided for other logic levels. Heading correction data from navigation computer 112 is applied to track-keeping interface 116 by heading correction data line 120. This data is gated into interface latches 122 by the presence of a computer device command signal. The command signal is applied to interface latches 122 of track keeping interface 116 by way of device command line 121.

Interface latches 122 retain the latched data until the next heading correction is provided by navigation computer 112. Interface latches 122 thus provide continuous inputs to digital-analog converter 124. Digital-to-analog converter 124 accepts the digital signal from interface latches 122 and converts it to an analog bipolar voltage level. Isolation amplifier 126 receives the dc voltage level from digital-to-analog converter 124 and protects autopilot 21 from erroneous signals due to ground loops.

Autopilot 21 supplies two voltages, +15 volts and −15 volts (not shown), to track-keeping interface 116 to power the portion of isolation amplifier 126 dedicated to autopilot 21. These voltage levels are applied by way of power bus 122. One of these two voltage levels is used in connection with the device command signal of navigation computer 112 in order to develop a device flag signal on device flag line 123 at the output of monostable vibrator 128. Autopilot 21 is protected by opto-isolator 130 while applying the +15 volt levels to monostable multivibrator 128 within interface 116. The device flag signal of line 123 indicates to navigation computer 112 that a data transfer is completed. If autopilot 21 is switched out of its track mode, the two voltage levels disappear and the device flag signal is not generated on device flag line 123. This causes navigation computer 112 to cease performing track keeping computations while autopilot 21 is unable to accept and use the corrections thus computed.

Many modifications and variations of the present invention are possible in view of the above disclosure. It is therefore to be understood, that within the scope of the appended claims, the invention may be practiced otherwise than as specifically described.

What is claimed is:

1. A method for automatically steering a ship over an indefinite distance along a desired ground track, said ship having an autopilot for receiving information to control the steering of said ship, comprising the steps of:

a) determining ship position of said ship;

(b determining desired ground track for said ship;

(c) determining the shortest distance from said ship position to the closest point on said desired ground track;

(d) determining the desired ground track heading compensation for said ship from the shortest distance from said ship position to closest point on the desired ground track in accordance with proportional and integral control equations, said determination of said compensation by said proportional and integral control equations being commenced when said ship is within a predetermined distance from said desired ground track, said predetermined distance being approximately one-tenth (1/10) of a nautical mile;

(e) applying said desired ground track heading compensation to said autopilot; and, (f) steering said ship by said autopilot in accordance with desired ground track heading compensation.

2. A method for automatically steering a ship over an indefinite distance along a desired ground track, said ship having an autopilot for receiving information to control the steering of said ship, comprising the steps of:

(a) determining ship position of said ship;

(b) determining desired ground track for said ship;

(c) determining the shortest distance from said ship position to the closest point on said desired ground track;

(d) determining the desired ground track heading compensation for said ship from the shortest distance from said ship position to closest point on the desired ground track in accordance width proportional and integral control equations, said determination of said compensation by said proportional and integral control equations being commenced when said ship is within a predetermined distance from said desired ground track;

(e) applying said desired ground track heading compensation to said autopilot, said applying said desired ground track heading compensation to said autopilot being terminated when said ship is within said predetermined distance and has a speed in excess of one-half (½) knot; and (f) steering said ship by said autopilot in accordance with desired ground track heading compensation.

3. The method of automatically steering a ship of claim 1, wherein said desired ground track compensation provides a maximum correction of fifteen (15) degrees when said ship is within said predetermined distance and has a maximum velocity of fifteen (15) knots.

\* \* \* \* \*